May 20, 1952 I. L. ASHKENAS 2,597,769
FULL POWER BOOST AIRPLANE CONTROL SYSTEM
Original Filed Dec. 11, 1944 4 Sheets-Sheet 1
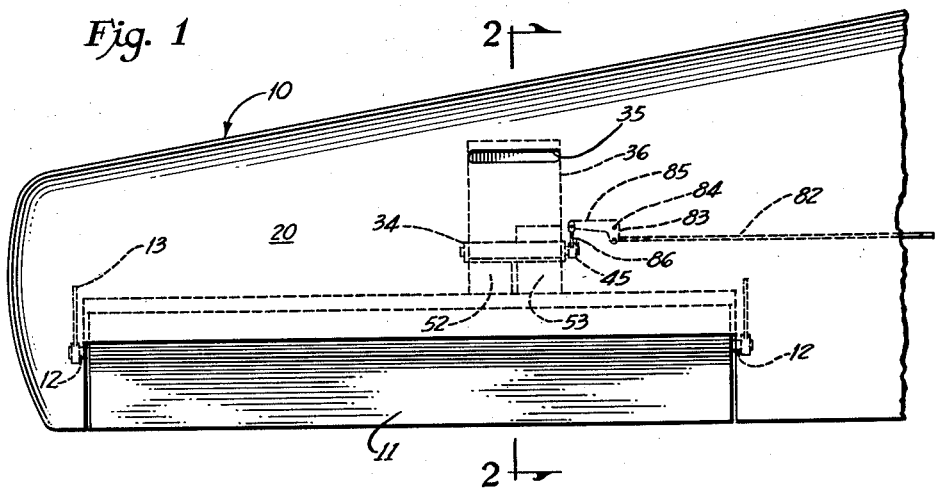
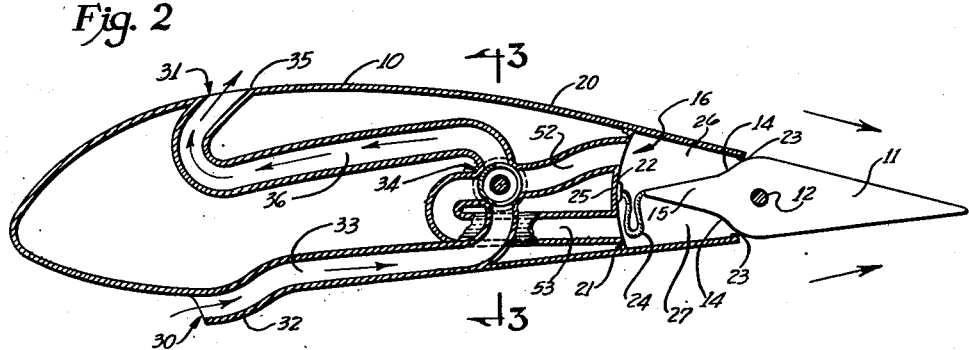
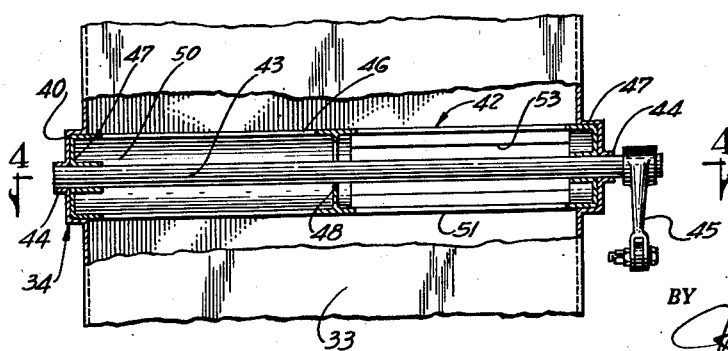
INVENTOR.
IRVING L. ASHKENAS
BY Herbert E. Metcalf
ATTORNEY May 20, 1952     I. L. ASHKENAS     2,597,769
FULL POWER BOOST AIRPLANE CONTROL SYSTEM
Original Filed Dec. 11, 1944     4 Sheets-Sheet 2

INVENTOR.
IRVING L. ASHKENAS
BY Hubert E. Metcalf
ATTORNEY

May 20, 1952  I. L. ASHKENAS  2,597,769
FULL POWER BOOST AIRPLANE CONTROL SYSTEM
Original Filed Dec. 11, 1944  4 Sheets-Sheet 3

INVENTOR.
IRVING L. ASHKENAS
BY
*Herbert E. Metcalf*
ATTORNEY

May 20, 1952     I. L. ASHKENAS     2,597,769
FULL POWER BOOST AIRPLANE CONTROL SYSTEM

Original Filed Dec. 11, 1944     4 Sheets-Sheet 4

INVENTOR.
IRVING L. ASHKENAS
BY
Herbert E. Metcalf
ATTORNEY

Patented May 20, 1952

2,597,769

UNITED STATES PATENT OFFICE 2,597,769

FULL-POWER BOOST AIRPLANE CONTROL SYSTEM

Irving L. Ashkenas, Beverly Hills, Calif., assignor to Northrop Aircraft, Inc., Hawthorne, Calif., a corporation of California Original application December 11, 1944, Serial No. 567,683, now Patent No. 2,559,817, dated July 10, 1951. Divided and this application October 1, 1948, Serial No. 52,366

3 Claims. (Cl. 244—85)

This application is a division of my prior application Serial Number 567,683, filed December 11, 1944, now Patent 2,559,817, issued July 10, 1951, and entitled "Aerodynamic Boost System."

The present invention relates to aircraft and, more particularly, to power means for operating a control surface of an airplane in accordance with the movements of a manually operated pilot's control element, these movements generating signals only to control the movement of the surface by regulation of the power developed by the power means, so that no part of the air load on the surfaces reaches the pilot's control element or the pilot.

The increasing size and speed of present and proposed airplanes has brought with it larger control surfaces and greater air loads thereon, until the point has been reached where the force required to move the control column is substantially equal to or even much greater than the strength of the pilot. In order to relieve the pilot of the physical strain of flying these large airplanes, the design of control systems has followed two trends, one being along the line of aerodynamic balances wherein an element of the control surface is acted upon by the air stream in a manner to provide a counter-balancing hinge moment opposite to and somewhat less than the hinge moment produced by the portion aft of the hinge axis.

The other trend has been toward so called power boost systems, either mechanical, electrical or hydraulic, attached to the pilot's control system and supplying some part of the energy required for movement of the control surfaces against the air loads acting thereon. The power boost is supplied by motor means driven by a suitable source of power, a valve or switch being operated by the pilot as he operates his control column so that both pilot power and motor power are simultaneously applied to the control surfaces, and so that at least part of the air loads on the surfaces can be felt by the pilot.

The first of these expedients increases aerodynamic drag of the control surfaces while the second involves complicated linkages tending to increase weight and to cause hunting of the control surfaces. It is an object of the present invention to provide a means and method of operating airplane control surfaces under full power, without transmitting force back to the pilot and with a simple mechanical unit that has minimum hunting characteristics.

With full power operation of the control surfaces the applied pilot force need only be nominal, and it is another object of the present invention to provide a full power operated airplane control surface where the control force supplied by the pilot is of negligible importance and uniform irrespective of the actual force required to move the control surface. The word "boost" is used in the present application as meaning movement of a control surface wholly by power, and not in the sense of indicating the addition of partial power to pilot power.

It is another object of the present invention to provide a full power boost arrangement for operating the control surfaces of an airplane in which, in a preferred form, the source of power preferably derives from the forward speed of the airplane and which is not, therefore, subject to failure of a power plant, electrical system, or hydraulic system.

The above objects are attained by the provision of a full power boost mechanism operable to move an attitude control surface. The power boost mechanism is energized by a boost power control means connected to be operated in accordance with the movements of the pilot's control element, such as the airplane stick or control column or the rudder pedals. No direct connection is made between the pilot's control element and the control surface, and the pilot's control element is completely isolated from the air loads developed on the control surface. The system of the present invention is adapted for automatic compensation with respect to air loads tending to displace the surface, as claimed in the parent application cited above. In a preferred form, the power required to operate the power boost mechanism is provided by aerodynamic pressure derived from the forward speed of the airplane.

These and other objects and advantages of the present invention will become apparent to those skilled in the art after consideration of the following detailed description of one preferred embodiment thereof, reference being had to the accompanying drawings in which:

Figure 1 is a top plan view of the outer end portion of a wing having a movable control surface and a fully powered boost mechanism therefor embodying the principles of the present invention;

Figure 2 is a sectional view, drawn to enlarged scale, taken along the lines 2—2 in Figure 1, the internal structure of the wing being omitted to show more clearly the construction and arrangement of the boost mechanism;

Figure 3 is a still further enlarged sectional view taken along the lines 3—3 in Figure 2, through the boost power control means, in this case a valve;

Figure 4:
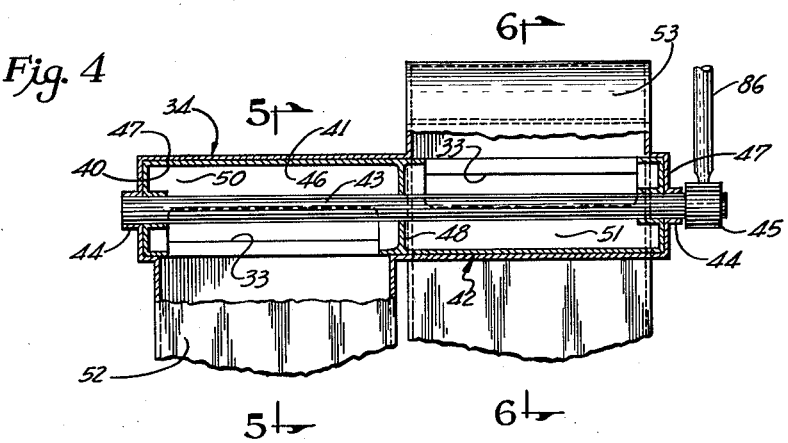
Figure 4 is a vertical sectional view taken along the lines 4—4 in Figure 3, showing the valve rotated to one of its operating positions.

In Figure 1 of the drawings, one form of control surface motor and motor control is shown for full power operation of an airplane control surface. In this figure, the reference numeral 10 designates a wing or other airfoil, such as one of the tail surfaces in a conventional airplane, the trailing edge portion for a substantial spanwise length thereof being formed by a movable control surface 11. The control surface 11 may be either the aileron, elevator, or rudder of a conventional airplane, or the elevon, as it is called, in a tailless type of airplane, such elevons being simultaneously movable in the same direction to provide elevator controls, or simultaneously movable in opposite directions to provide aileron control. Hinge pins 12 are provided at the ends of control surface 11 and are journaled in bracket supports 13 which are mounted on the rear spar (not shown) of the wing and extend rearwardly therefrom.

A fluid pressure boost mechanism or motor is provided, capable of moving the control surface 11 against the air loads imposed thereon in flight.

Figure 7:
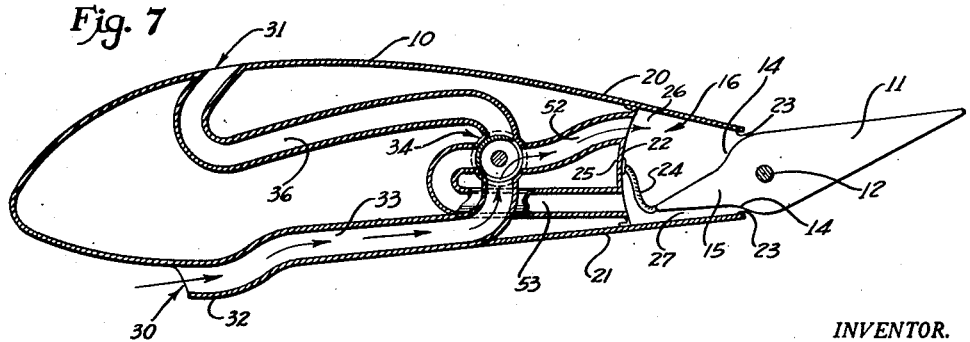
Figure 7 is a view similar to Figure 2, showing the position assumed by the control surface when the valve means is rotated to the position shown in Figures 5 and 6.

Ahead of the hinge axis 12, the top and bottom surfaces of the control surface 11 are cylindrically curved at 14 about the hinge axis as a center, terminating at the root of a forwardly extending balance vane portion or piston 15, the top and bottom surfaces of which converge forwardly to a relatively sharp-nosed leading edge. The balance 15 is disposed within a chamber 16 formed in the rear edge of the wing by the upper skin 20, lower skin 21, and a front wall 22, the latter being preferably, although not necessarily, cylindrically curved about the hinge axis 12 as a center in order to reduce the volumetric capacity of the chamber 16 to the minimum. Suitable pressure seals 23 are provided along the rear edges of the upper and lower skins, respectively, which bear against the cylindrical portion 14 of the control surface to seal the chamber 16 pressure-tight. Attached to the nose of the vane 15 in any suitable manner is a flexible curtain or diaphragm 24 which is also attached at 25 to the wall 22. The curtain 24 has sufficient slack in it to permit maximum deflection of the control surface 11, as shown in Figure 7, and together with the balance portion 15, divides the chamber 16 into an upper compartment 26 and a lower compartment 27, said compartments being pressure-tight from one another.

Power for the operation of the boost mechanism just described is preferably derived from the forward speed of the airplane, and the control surface 11 is moved up or down by a differential air pressure condition created in compartments 26 and 27 on opposite sides of the balance 15, the latter acting as a piston, pressure being obtained from a high pressure source 30 and a low pressure source 31 and mixed in varying proportions to produce intermediate pressures which are led to the compartments 26 and 27, respectively. The high pressure source 30 is preferably in the form of a forwardly facing ram air scoop 32 which projects below the bottom skin 21 near the leading edge of the airplane wing in a region where relatively high dynamic or impact pressures are encountered. The scoop 32 is connected by an entrance duct 33 to a boost power control, in this case valve means indicated generally by the reference numeral 34, which controls the power applied to the boost mechanism. The low pressure source 31 is preferably in the form of a rearwardly directed opening 35 in the upper skin 20 near the leading edge of the airplane wing in a region where relatively high negative pressures are normally obtained. An exit duct 36 connects the opening 35 with the valve means 34.

The valve means 34 comprises a housing 40 having a cylindrical chamber 41 in its interior within which is disposed a close-fitting, rotatable, cylindrical valve member 42 mounted on a shaft 43. The shaft 43 is journaled in bearing portion 44 in the housing, and mounted on one of its ends outside of the housing 40 in a downwardly extending operating arm 45. The valve member 42 is in the form of a sleeve 46 having end plates 47 and a center portion 48 dividing the valve into two separate compartments. One-half of the sleeve wall on either side of the partition 48 is cut out, leaving hemicylindrical gates 50 and 51 which are angularly spaced apart 180 degrees from one another.

The ducts 33 and 36 open into the bottom and top, respectively, of the valve housing 40 at 180 degrees spaced angular relationship, providing ports which are adapted to be covered or uncovered by the gates 50 and 51 as the valve is rotated. A duct 52 which is connected to the top compartment 26 of the balance chamber 16 extends forwardly therefrom and connects into the left-hand compartment (see Figure 4) of the valve on the backside thereof midway between ducts 33 and 36. Another duct 53, which is connected to the bottom compartment 27, extends forwardly beneath the valve housing 40 and bends around to connect into the right-hand compartment at its front side midway between ducts 33 and 36. It will be noted by comparing Figures 5 and 6 that duct 52 lies opposite gate 50, while duct 53 lies opposite gate 51.

The operation of the valve means 34 to control the power admitted to the boost mechanism is as follows: When the valve member 42 is in neutral or centered position, as shown in Figures 2, 3, the ducts 33 and 36 are each half closed by the valve gates 50 and 51. Hence, air which is taken in by the scoop 32 passes along duct 33, through the valve 34, and is drawn out through duct 36, spilling out of the opening 35. Since the ducts 33 and 36 are open to the same extent in each of the valve compartments when the valve is in neutral position, the resulting pressure in both of the compartments is the same and the pressure on opposite sides of the balance baffle 15 is the same.

Figure 5:
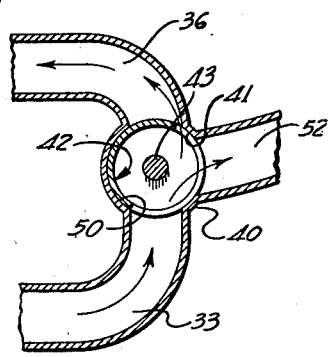
Figure 5 is a sectional view taken along the line 5—5 in Figure 4.
Figure 6:
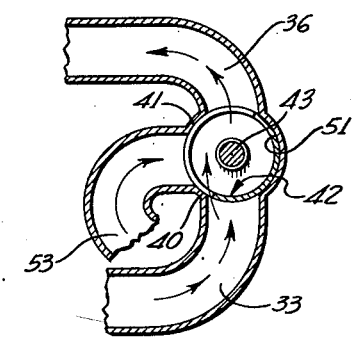
Figure 6 is a corresponding view of the other valve section at the same instant, the section line being designated 6—6 in Figure 4.

If the valve member 42 is rotated, however, to the position shown in Figures 5 and 6 or to any intermediate position between neutral and extreme operating position, the pressure within the left-hand compartment will rise due to partially closing the exit duct 36 and simultaneously opening the entrance duct 33. At the same time, the pressure within the right-hand compartment will fall due to partially closing the entrance duct 33 and simultaneously opening the exit duct 36. The resulting pressure differential on opposite sides of the balance vane or piston 15 (high pressure in the top compartment and low pressure in the bottom, produces a hinge moment on the control surface 11, swinging the latter to the position shown in Figure 7, or to an intermediate position if the valve has been rotated to an intermediate position between neutral and extreme operating position. The magnitude of the hinge moment on the control surface is directly proportional to the pressure difference on opposite sides of the balance baffle 15, and the pressure difference, in turn, is proportional to the angular displacement of the valve member 42 from its neutral position, hence the relative position of the control surface 11 for any given aerodynamic condition is determined by the relative position of the valve member 42.

Figure 11:
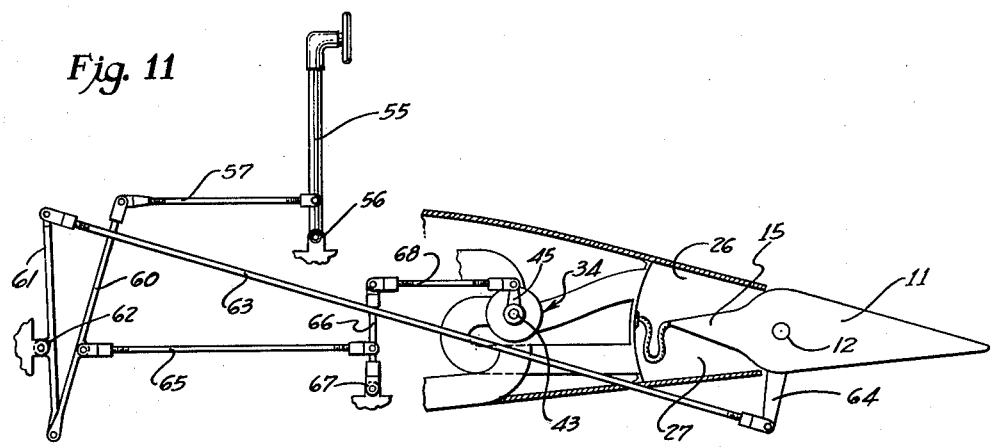
Figure 11 is a schematic diagram of another embodiment of a control system embodying the present invention.

Valve member 42 is connected to the control column of the airplane and can be operated solely by the control column, for example, when the power boost mechanism is utilized to operate or ailerons; or it may be connected to additional mechanism to provide automatic gust displacement compensation for elevators, for example, as shown diagrammatically in Figure 11.

In this figure, the valve member 42 is connected to the control column or stick of the airplane and is adapted to be actuated thereby through a system of linkage. The control column is indicated by the reference numeral 55 and is pivotally supported at 56 on the airplane structure for fore-and-aft swinging movement. Since fore-and-aft movement of the control column produces longitudinal control of the airplane, the control surface 11 in this instance represents either an elevator of a conventional airplane or an elevon of a tailless airplane operated in elevator directions. Similar linkage systems and booster mechanisms can be employed for gust displacement compensation for each of the other control surface systems on the airplane if desired, but only one of such systems is shown and described herein for the sake of simplicity. A link 57 is connected to the control column 55 above the pivots 56 and to the upper end of a scissors member 60, the lower end of member 60 being pivotally joined to the lower end of a second scissors member 61. Member 61 is swingably supported intermediate its ends at a fixed pivot point 62, and the upper end of member 61 is connected by a followup link 63 to a downwardly extending horn 64 on the control surface. A link 65 is connected to member 60 intermediate its ends and to a lever arm 66 intermediate its ends, arm 66 being swingably supported on a fixed pivot point 67. A link 68 connects the upper end of arm 66 to the end of the valve operating arm 45, the purpose of the arm 66 being to multiply the motion of the link 65.

The operation of the control system linkage is as follows: When the control column 55 is pulled back, or to the right as viewed in Figure 11, scissors member 60 is swung to the right about the pivot connection at its lower end, pushing link 65 to the right. Arm 66 is swung in a clockwise direction about pivot 67 by this movement of the link 65, causing the operating arm 45 and valve member 42 to rotate in a clockwise direction whereby a higher pressure is obtained in the upper compartment 26 than in the lower compartment 27. The hinge moment produced by the pressure differential acting on balance 15 causes the control surface 11 to swing upwardly. As the horn 64 swings counterclockwise with the control surface 11, the link 63 rocks member 61 in a clockwise direction about the fixed pivot 62. This moves the connection at the bottom of member 61 to the left, pulling link 65 with it and rotating the actuating arm 45 and valve member 42 in a counterclockwise direction to a position at which the hinge moment due to the pressure differential on opposite sides of balance 15 is equal to that due to the air loads acting on control surface 11, and a condition of equilibrium is reached.

If a gust should strike the control surface 11 from below, swinging it up, or counterclockwise, while the control column 55 is held against movement, the horn 64 will pull the scissors member 61 around in a clockwise direction, rotating the operating arm 45 and valve member 42 in a counterclockwise direction to produce a hinge moment restoring the control surface to its original position before displacement. Thus, the follow-up action of the control system linkage described above tends always to maintain a given angular relationship except for the motion lost in actuating the valve, between the control surface 11 and the control column 55, and any force acting to disturb that relationship, whether the force be applied at the column 55 or at the surface 11, causes the valve 34 to be actuated in a manner to produce a hinge moment for restoring the said relationship.

However, it should be noted that the actuation of valve 34 does not impose any load on the control column 55 and that even with the follow-up linkage just described the control column is completely isolated from the air loads on surface 11 at all times.

It should be mentioned at this point that apparent discrepancies between the control system linkage as shown in Figure 1 and that illustrated in Figure 11 are due to the fact that Figure 11 is a diagrammatical sketch to illustrate in the simplest form the general arrangement and function of the several parts when a follow-up linkage is used, whereas, Figure 1 is a plan view of a suggested installation, with its particular requirements due to structural or other mechanical conditions.

Accordingly, push-pull rod 82 in Figure 1 may be identified as either the link 65 or 68 of the follow-up linkage shown in Figure 11. The outer end of the push-pull rod 82 is connected to the short, rearwardly extending arm 83 of a bell crank which is pivoted at 84, and the long, spanwise extending arm 85 of the bell crank is connected at its outer end to a link 86 which is connected to the operating arm 45 on the shaft 42 of the valve 34. The different length arms of the bell crank act to multiply the motion of rod 82 so as to obtain a greater angular movement of the valve member 42 and correspondingly greater response of the control surface. As pointed out above, when no follow-up linkage, as shown in Figure 11, is to be used, rod 82 can be directly connected to the control column 55 to be moved thereby.

Figure 8:
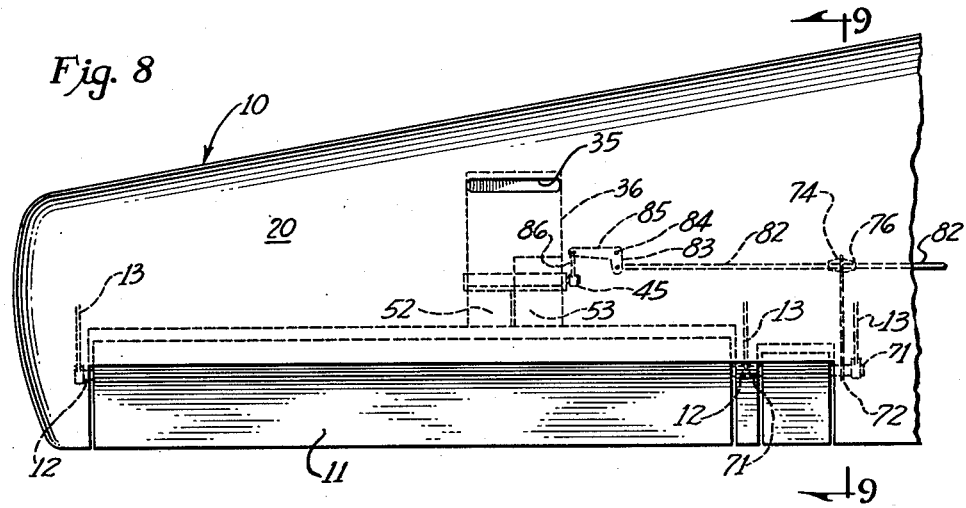
Figure 8 is a view similar to Figure 1, but showing, in addition, a flipper which is adapted to trail upwardly at high angles of attack and is operatively connected to the boost mechanism to overcome the increment of hinge moment on the control surface caused by stalling or partial stalling of the wing.
Figure 9:
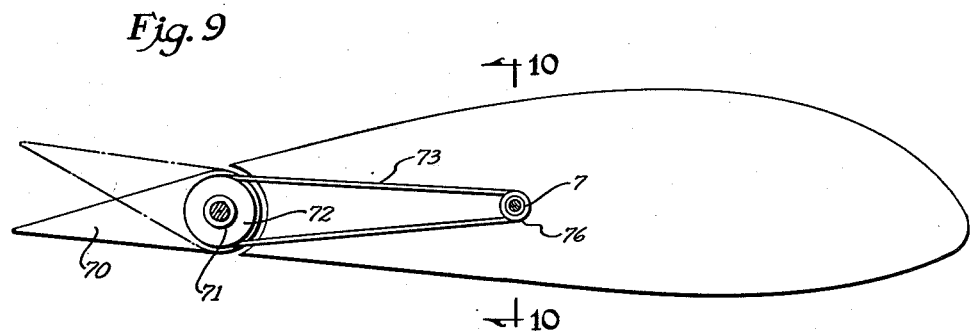
Figure 9 is a sectional view taken along the line 9—9 in Figure 8, showing in broken lines the upwardly trailing position taken by the freely floating flipper at high angles of attack.
Figure 10:
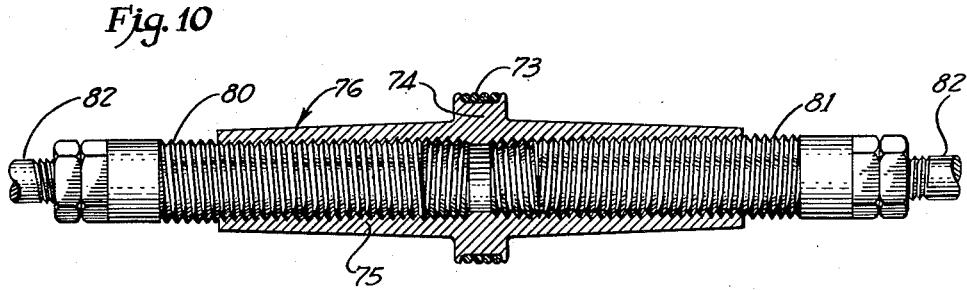
Figure 10 is an enlarged sectional view taken along the lines 10—10 in Figure 9.

While gusts may occur in normal flight, an equivalent force tending to make a trailing elevator surface trail upwardly is generated at or near the stalling attitude and speed of the airplane airfoil to which the elevator is attached. The power boost mechanism described herein, when used without the compensating linkage shown in Figure 11, can readily be adapted for stall force displacement compensation as shown in Figures 8, 9, and 10.

In these figures, means are provided for overcoming the tendency of the control surface 11 to trail upwardly at high angles of attack. A flipper 70 is disposed in the trailing edge of the wing 10 inboard of the control surface 11, said flipper being in the nature of a round-nosed, short span flap having hinge pins 71 at its ends, which are journaled in the bracket supports 13. The flipper 70 is free to swing up or down under the influence of the changing pressure distribution over the airfoil at increased angles of attack, and its sole function is to superimpose a certain amount of valve actuation on the control system linkage so as to control the "zero" position of the valve as a function of the angle of attack, and thereby reduce the trailing angle of the control surface to the desired value. To this end a large diameter sheave wheel 72 is fixedly mounted on the inboard hinge pin 71 to rotate with the flipper 70, and a cable or line 73 is trained around and attached thereto. The cable 73 extends forwardly from the sheave wheel 72 and is trained around a smaller sheave wheel 74 comprising an integral part of the body 75 of a turnbuckle 76 (see Figure 10). Threaded members 80 and 81 of opposite hand lead are screwed into the ends of the turnbuckle body, and these members are secured, in turn, to the ends of the push-pull rods 82 forming a part of the control system linkage as shown in Figure 8.

The operation of the flipper 70 is as follows: When the flipper swings up to the position shown in broken lines in Figure 9, rotation of the sheave wheel 72 causes the small sheave wheel 74 to be rotated through a correspondingly greater angle due to the difference in their diameters. Rotation of the turnbuckle body 75 draws the threaded members 80 and 81 together, effectively shortening the length of push-pull rod 82 and operating the valve 34 to produce a balance hinge moment acting to reduce the trailing angle of the control surface 11 to the desired value. When the pilot moves the control column 55, the valve member 42 is rotated from the zero position imposed by the flipper, but neither the length of the push rod 82 nor the position of the flipper 70 is affected by movement of control surface 11 or control column 55.

Figure 13:
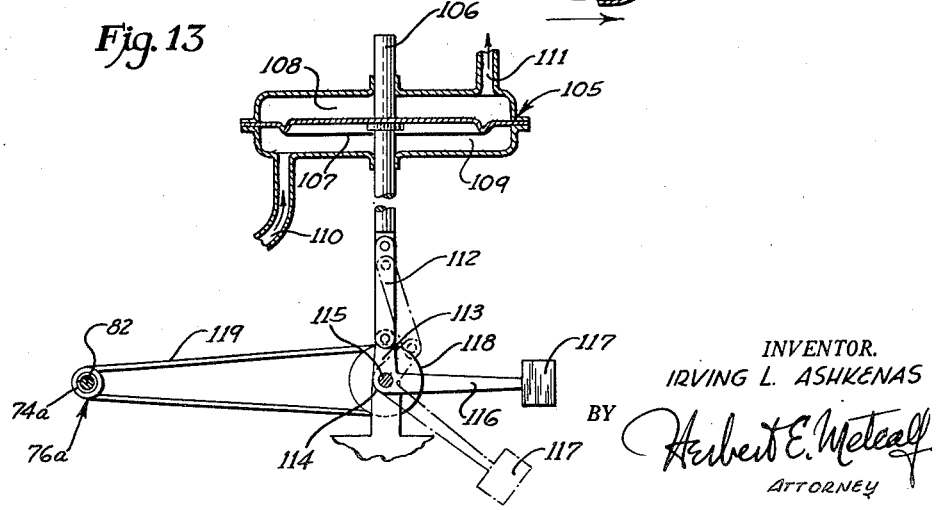
Figure 13 is a schematic diagram of another embodiment of the means for overcoming the upwardly trailing tendency of the control surface.

Another embodiment of a means for overcoming the tendency of the control surface 11 to trail upwardly when the wing is stalled or partially stalled is shown more or less schematically in Figure 13 as applied to the power boost mechanism of the present invention. In this arrangement, a chamber 105 is provided which is rigidly fixed to any suitable part of the airplane structure, and extending vertically through the chamber is a slideable rod 106. Fixed to the rod 106 inside the chamber is a diaphragm 107 which is suitably sealed to the side walls of the chamber and divides it into upper and lower compartments 108 and 109, respectively. A duct 110 communicates with the lower compartment 109 and is connected to a forwardly opening ram air scoop (not shown) whereby the lower compartment is pressurized to the extent of the available dynamic pressure. A second duct 111 communicates with the upper compartment 108 and is connected to a rearwardly directed opening (not shown) which is located in a low pressure region on the fuselage or airfoil so that a reduced (static) pressure proportional to the air speed is obtained in the upper compartment. The pressure differential on opposite sides of the diaphragm 107 resulting from the positive, or dynamic pressure in the lower compartment, and the negative, or static pressure in the upper compartment exerts an upwardly directed force on the diaphragm proportional to the dynamic pressure of the flow which is denoted by the symbol $q$ and is defined: $q = \frac{1}{2} P V^2$ where P is the density of air and V is the true air speed.

Connected to the lower end of the rod 106 is a link 112, the lower end of which is connected, in turn, to the upwardly extending arm 113 of a bell crank 114. Rod 106, link 112, and arm 113 are arranged to lie in a straight line when fully extended, as shown in solid lines in Figure 13. The bell crank 114 is pivotally supported on a fixed pivot 115 and has a horizontally extending arm 116, to the outer end of which is affixed a weight 117. A sheave wheel 118 is fixed to the bell crank 114 with its center at the pivot 115, and trained around and attached to the sheave wheel is a cable 119. The cable 119 is also trained around and attached to a smaller sheave wheel 74a comprising an integral part of the body of a turnbuckle 76a which is the same in construction and function as turnbuckle 76 illustrated in Figures 9 and 10 and described earlier. Turnbuckle 76a operates to extend or shorten control rod 82a when it is turned, actuating the valve 34 in the manner previously described to reduce the trailing angle of the control surface to the desired value.

The operation of the device described above is as follows: The differential air pressure obtained on opposite sides of the diaphragm 107 urges the latter upwardly, tending to straighten the linkage into the straight line condition shown in solid lines. At the same time, the moment produced by the weight 117 acting downwardly on the end of the arm 116 tends to rotate the bell crank 114 in a clockwise direction and jack-knife the members 112 and 113 as shown in broken lines. Since the moment produced by the weight 117 is opposed by the moment produced by the force acting on the diaphragm 107 and applied to arm 113 of bell crank 114, it is seen that the position of rest assumed by the bell crank 114 is a function of the dynamic pressure of the air flow, which, in turn, is proportional to the square of the air speed. As the total pressure on the diaphragm 107 decreases, the bell crank 114 rotates in a clockwise direction until the resulting moment arm has correspondingly increased in length to produce a condition of equilibrium between the opposing moments. When the airplane is flying at a relatively high speed and low angle of attack, the total force acting on the diaphragm is high and the pull exerted thereby extends the linkage 106, 112 and 113 to substantially a straight line. As the airplane approaches a stall, however, the total force acting on the diaphragm drops off and the bell crank 114 rocks to the corresponding position of rest, rotating the turnbuckle 16a and actuating the valve 34 to overcome the upwardly trailing tendency of the control surface when it is partially stalled.

The combination of the fully powered boost mechanism shown, described and claimed herein with the various means for automatic compensation of control surface displacement is shown, described and claimed in my parent application cited above.

Figure 12:
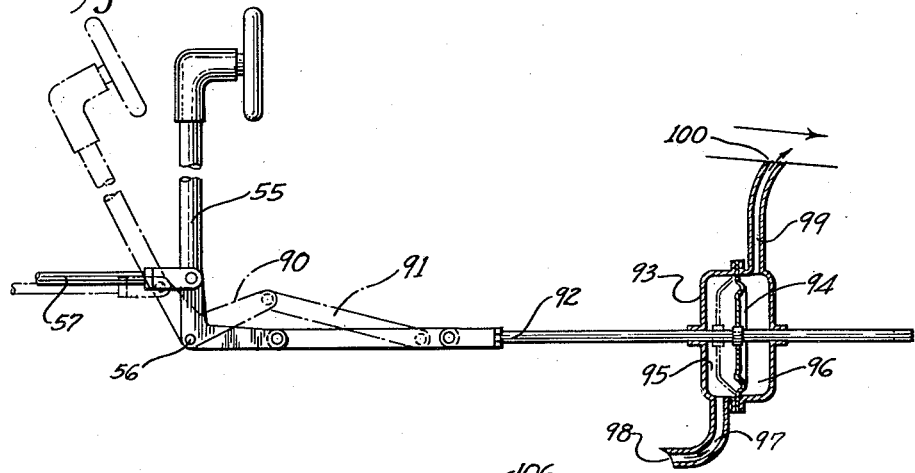
Figure 12 is a diagrammatic side elevation of a mechanism for loading the control system to impart a sense of feel thereto.

Although the control system as described up to this point is complete and operative from a functional standpoint, such a system is devoid of any "feel" of the air loads acting upon the control surfaces, and lacking in the normal tendency of the controls to center themselves. Since this feel is deemed highly desirable by the majority of pilots, there can be provided in the control system a means for applying a load thereto which duplicates the feel of directly connected controls. The loading means is illustrated more or less schematically in Figure 12, and is similar in construction to the arrangement shown in Figure 13, comprising an arm 90 which is rigidly fixed to the lower end of the control column 55 at right angles thereto. A link 91 is connected to the arm 90 and to one end of a rod 92 which extends through and is slideable in a chamber 93, the arm 90, link 91, and rod 92 being disposed in a straight line when the control column 55 is in its neutral or centered position. Fixed to the rod 92 inside the chamber 93 is a diaphragm 94 which divides the chamber 93 into two separate, pressure-tight compartments 95 and 96. A duct 97 terminating in a forwardly facing ram air scoop 98 is connected to compartment 95, while a second duct 99 terminating in a rearwardly directed opening 100 located in a low pressure region on the fuselage or airfoil is connected to compartment 96. As in the case of the arrangement shown in Figure 13, there is a pressure differential proportional to the speed of the airplane created on opposite sides of the diaphragm 94, urging the latter to the right. When the control column 55 is moved in either direction from its centered position, however, the arm 90 and links 91 are jackknifed upwardly or downwardly, as the case may be, pulling the rod 92 to the left against the pressure exerted on the diaphragm. The force on the diaphragm 94 is constant for any given air speed, but the hinge moment produced by the mechanism on the control column 55 increases as the angular deflection of the control column increases due to the greater moment arm. The total force on the diaphragm is proportional to the dynamic pressure of the flow; hence, the loading force exerted on the control column 55 varies as the square of the air speed in exactly the same manner that the air loads on the control surface vary, and the resulting stick-force is similar to that experienced with controls connected directly to the control surfaces, acting at all times to return the control column to its neutral, centered position and with a restoring force proportional to air speed.

From the above description, it will also be clearly seen that the present invention makes possible the full power operation of airplane control surfaces irrespective of size or aerodynamic resistance to motion. There is no feed back of any kind from surface to pilot. The operation of the valve means requires only a few pounds of pilot effort, less, in fact, than that required to overcome the overall resistance of the cable system and the control centralizing device, when used. The overall pilot effort for normal piloting is small, irrespective of control surface area and aerodynamic forces exerted thereon. The control forces may be made any desired magnitude or made to vary in most any desired manner. Since the control forces can be made any desired magnitude, a control stick rather than a column and wheel becomes possible even on very large airplanes, thus simplifying cockpit design and improving instrument visibility.

As the control linkage carries only friction forces and is used to transmit a signal rather than a force, the linkage may be very small in diameter with resulting decrease in friction, weight, and sensitivity to temperature changes. In addition, the present invention makes possible the use of one surface to accomplish landing flap, dive brake, and aileron functions, for example, since erratically varying hinge moments will not cause erratic control forces.

While I have shown and described in detail one preferred specific embodiment of the broad invention, it is to be understood that various modifications of the structure and connecting linkage may be made within the scope of the present invention, and all such modifications are contemplated as falling within the spirit and scope of the invention as claimed.

What is claimed is:

1. In an airplane control system, a manually movable pilot's control element, a movable control surface, operating means for said control surface comprising, in combination, a closed chamber, a movable member within said chamber dividing it into two separate pressure-tight compartments, said member being operatively connected with said control surface, first duct means opening into the airstream in a direction and at a location such that the available pressure in the duct is greater than atmospheric pressure by an amount proportional to the relative velocity of the air, second duct means opening into the airstream in a direction and at a location such that the available pressure in the duct is less than atmospheric pressure by an amount proportional to the relative velocity of the air, a first valve means connected to both of said duct means and to one of said compartments for mixing the available pressures in any desired proportions to produce an intermediate pressure which is directed to said one compartment, a second valve means connected to both of said duct means and to the other of said compartments for mixing the pressures to produce an intermediate pressure which is directed to said other compartment, and means for actuating said first and second valve means simultaneously by movements of said pilot's control element to produce a pressure differential on opposite sides of said member.

2. In an airplane control system, a manually movable pilot's control element, a movable control surface, operating means for said control surface comprising, in combination, a closed chamber, a movable member within said chamber dividing it into two separate pressure-tight compartments, said member being operatively connected with said control surface, first duct means opening into the airstream in a direction and at a location such that the available pressure in the duct is greater than atmospheric pressure by an amount proportional to the relative velocity of the air, second duct means opening into the airstream in a direction and at a location such that the available pressure in the duct is less than atmospheric pressure by an amount proportional to the relative velocity of the air, valve means connected to said two duct means and to said compartments for selectively mixing the pressures in the duct means into two resulting pressures, one of which is greater than atmospheric pressure and the other of which is less than atmospheric pressure, said two resulting pressures being directed to opposite compartments to produce a pressure differential on opposite sides of said member, and means for directly connecting said pilot's control element to said valve means only.

3. In an aircraft having a movable control surface, operating means for said control surface comprising, in combination, a closed chamber on the aircraft, a member connected to said control surface and movable therewith, said member being disposed within said chamber and dividing it into two separate pressure-tight compartments, first duct means opening into the airstream in a direction and at a location whereby a positive pressure is available, second duct means opening into the airstream in a direction and at a location whereby a negative pressure is available, valve means connected to said first and second duct means and to said two compartments for mixing the available pressures into opposite sides of said member to operate said control surface, a pilot operable control element within the body of the aircraft and connected to said valve means only for operating the latter, and feed back means connecting said surface to move said valve means only over the entire range thereof without interference with said pilot operable control element.

IRVING L. ASHKENAS.

REFERENCES CITED

The following references are of record in the file of this patent:

UNITED STATES PATENTS

| Number | Name | Date |
|---|---|---|
| 1,018,400 | White | Feb. 20, 1912 |
| 1,817,903 | Aikman | Aug. 11, 1931 |
| 2,445,343 | Tyra | July 20, 1948 |
| 2,515,475 | Shoemaker | July 18, 1950 |

FOREIGN PATENTS

| Number | Country | Date |
|---|---|---|
| 441,603 | France | May 30, 1912 |